(12) United States Patent
Thirion (10) Patent No.: US 10,070,119 B2
(45) Date of Patent: Sep. 4, 2018

(54) DEVICE AND METHOD TO RECONSTRUCT FACE AND BODY IN 3D

(71) Applicant: QUANTIFICARE S.A., Valbonne (FR)

(72) Inventor: Jean-Philippe Thirion, Valbonne (FR)

(73) Assignee: QuantifiCare, Valbonne (FR)

( * ) Notice: Subject to any disclaimer, the term of this patent is extended or adjusted under 35 U.S.C. 154(b) by 79 days.

(21) Appl. No.: 15/289,981

(22) Filed: Oct. 11, 2016

(65) Prior Publication Data
US 2017/0111632 A1 Apr. 20, 2017

(30) Foreign Application Priority Data
Oct. 14, 2015 (FR) ..................................... 15 02170

(51) Int. Cl.
| | |
|---|---|
| *H04N 13/218* | (2018.01) |
| *G03B 13/20* | (2006.01) |
| *G03B 35/08* | (2006.01) |
| *H04N 13/128* | (2018.01) |
| *G01B 11/25* | (2006.01) |
| *G01C 11/02* | (2006.01) |
| *G06T 7/60* | (2017.01) |
| *G06T 17/00* | (2006.01) |
| *G06T 19/00* | (2011.01) |
| *H04N 5/225* | (2006.01) |
| *H04N 13/00* | (2018.01) |

(52) U.S. Cl.
CPC ....... *H04N 13/218* (2018.05); *G01B 11/2513* (2013.01); *G01C 11/02* (2013.01); *G03B 13/20* (2013.01); *G03B 35/08* (2013.01); *G06T 7/60* (2013.01); *G06T 17/00* (2013.01); *G06T 19/00* (2013.01); *H04N 5/2254* (2013.01); *H04N 13/128* (2018.05); *G06T 2200/04* (2013.01); *H04N 2013/0081* (2013.01)

(58) Field of Classification Search
None
See application file for complete search history.

(56) References Cited

U.S. PATENT DOCUMENTS

2005/0212951 A1* 9/2005 Miyata .................... G02B 7/04
348/345
2009/0220144 A1* 9/2009 Mein ........................ G01C 1/04
382/154

(Continued)

*Primary Examiner* — Eileen M Adams (57) ABSTRACT

The device and method are intended for reconstructing in 3-Dimensions comprehensive representations of the head and torso of subject (S) with a portable stereophotogrammetry device which can operate at, at least, two predefined positions (A3, A4).
The device is composed of a camera body (1), a double optics (2) and a measuring distance system (34) enabling the repositioning of subject (S) at position (A3) or (A4). The user can operate a switch (5) to select one of these at least two pre-defined positions. The method is further to process the stereo-pairs of the subject to reconstruct 3-Dimensional surfaces (400), match them (500) and then stitch them (600) in a comprehensive representation of the subject. By selecting a distance corresponding to a field of view of respectively approximately A4 dimension the device and method is enabling reconstructing the face and of approximately A3 dimension is enabling reconstructing the torso of subject (S).

11 Claims, 5 Drawing Sheets

(56) References Cited

U.S. PATENT DOCUMENTS

| | | | | |
|---|---|---|---|---|
| 2010/0188429 A1* | 7/2010 | Friedman | .............. | G06F 3/0346 345/661 |
| 2011/0175987 A1* | 7/2011 | Hoffmeier | ............ | H04N 13/239 348/47 |
| 2013/0060146 A1* | 3/2013 | Yang | ...................... | A61B 5/055 600/476 |

* cited by examiner

DEVICE AND METHOD TO RECONSTRUCT FACE AND BODY IN 3D

BACKGROUND INFORMATION

The present invention relates to a stereophotogrammetry device, preferably portable and a method to acquire, reconstruct in 3D and measure characteristics and changes in 3-Dimensions of the head and body surfaces.

For Plastic Surgery, 3D reconstruction is necessary to reconstruct the surfaces of body parts in order to measure the geometry of subjects, analyze their shapes, simulate surgical procedures and also to collect body surface information over time in order to compare and measure geometric variations.

Plastic surgeons are particularly interested in the 3D surface of the face for surgical procedures such as rhinoplasty and various lift procedures. Other areas of interest include the 3D surface of the torso, breast surgery and breast implant selection as well as other parts of the body such as buttocks, hips, neck, sternum region, hands and various other areas. The needs in these areas correspond to large variations in the field of view given that the surface of a complete torso is much larger than of a face.

Stereophotogrammetry consists in gathering the images of a subject from at least two view with a calibrated camera whose optics are perfectly modeled. When two such images are acquired simultaneously, one generally refers to it as a stereo-pair and by finding corresponding points between the two images of the stereo-pair using cross-correlation types of algorithms, one can reconstruct via triangulation a dense representation in 3-Dimensions of the surface of the observed object.

Calibration of the optics is one of the key steps necessary for accurate 3-Dimensional reconstruction. The geometric accuracy necessary to build the optics is such that in practice it is not possible to have them with mobile parts, which means that stereophotogrammetry devices used to reconstruct anatomical surfaces have a fixed focal plane. Along with the aperture of the optics, this defines a fixed depth of field spaced around the focal plane and a fixed field of view.

Thus, for 3D reconstruction of the face, a specialist will use a stereophotogrammetry camera with a focus distance corresponding to a field of view of approximately an A4 surface format that is 21 cm times 29.7 cm. For breast 3D reconstruction, a specialist would use a stereophotogrammetry camera with a focus distance corresponding to a field of view of approximately an A3 surface format that is 29.7 cm times 42 cm.

In practice, a specialist is using two distinct stereophotogrammetry cameras for acquiring on one side, the 3D representation of faces and on the other, the 3D representations of the breast.

In general, it is necessary to add to the stereophotogrammetry system some means to position the subject at a distance corresponding to the focus plane. One way to achieve such a fixed distance positioning is to use a portable stereophotogrammetry system such as the one described in "MAVIS: a non-invasive instrument to measure area and volume of wounds. Measurement of Area and Volume Instrument System", by Plassmann P, Jones T D, Med. End. Phys. 1998; 20(5):332-8. Such stereophotogrammetry system is equipped with a pair of light projectors—also called light beamers or pointers—converging at a fixed distance which correspond to the focus plane of the stereo camera.

In the case of a curved anatomical surface such as a face or breast, some important parts are not visible simultaneously from both optics of the stereo camera. This can be due to the curvature of the subject and is independent from the width of the field of view of the device. As a consequence, some parts of the subject cannot be reconstructed in 3D from a single stereo-pair regardless of the width of the field of view.

For such reason, static multi-heads 3-Dimensional systems have been developed in order to take simultaneously several stereo-pairs of the same subject, in order to cover the "dead angles". By calibrating the exact position of these different camera heads thanks to calibration targets, it is then possible to "stitch" the different 3D surfaces obtained in order to generate a single 3D surface representation without hidden parts. This has been done for the head as well as for breast and torso 3D reconstructions.

This technique which is delicate to implement is called "stitching". Stitching has been used originally to piece together different 2D images in order to produce a 2D panoramic scenery picture. It has been extended to 3D surfaces and associated image textures in order to build single 3D representations of a subject's surface from several individual surface pieces. Typically, these static multi-head systems are using three to four heads depending upon the applications.

The "LifeViz II" as described in "Exhibition Watch Report—in Cosmetics 2013" 2013, XP055139703, Paris, pages 8 and 9 which the system's design is credited the author of the present disclosure. The system is composed of a portable stereophotogrammetry camera with light beamers and computation means which enable the stitching of the 3D surfaces obtained from multiple stereo-pairs in order to reconstruct in 3-Dimensions a comprehensive surface of a face or breast.

The difficulty solved by this system is to be able to stitch different views at different time points and according to different viewpoints corresponding to unknown angles. This system is in contrast to fixed multi-head systems for which the different viewpoints are perfectly known geometrically via a-priori calibration.

In order to develop the LifeViz II, it was necessary to develop innovative 3D surface matching algorithms enabling to automatically retrieve each position of the camera when it was used to take each of the views. Other innovative algorithms were necessary to fuse the texture maps acquired with different light conditions as well as surfaces which may have slightly deformed between each view given the subject may have moved or deformed between snapshots.

The LifeViz II is considered the state of the art relative to portable stereophotogrammetry systems. It is limited by the fact that it needs to be built and optimized for one single fixed distance for image acquisition. Hence, there are stereophotogrammetry devices optimized for face 3D reconstruction and for which the field of view is approximately equivalent to an A4 surface and other models optimized for the 3D reconstruction of the torso and for which the field of view is approximately equivalent to an A3 surface area.

Indeed, with a field of view close to A4 surface format, it is possible to cover a face with 3 or 4 views with a portable system. With a portable system and a field of view restricted to A4, and because it is necessary to get some overlap between the different surfaces in order to match and stitch them, using such a system for the torso would necessitate in practice too many A4 views. Furthermore, it would be quite difficult to manually position the camera in space as well as keep the subject still for the numerous views required with an A4-type of device.

By using a system whose field of view corresponds to an A3 format, and in order to avoid the dead angles, one can cover the surface of a torso with three to five views and with relatively simple instructions for a subject's positioning.

With a system whose field of view corresponds to an A3 format, one can also acquire the stereo-pairs necessary to reconstruct a face but with a much reduced resolution given the surface of the image used to represent the face is very restricted and many pixels are unused.

To conclude, portable stereophotogrammetry devices currently developed are including a single, nominal distance for picture taking which is optimized either for the face or for breast, but not optimized for both applications at the same time. A specialist wanting to use a portable system for both the head and torso simultaneously would use a system designed for torso but will lose accuracy when the face surface 3D reconstruction will be needed.

BRIEF SUMMARY OF THE INVENTION

The device being disclosed is a stereophotogrammetry device optimized for at least two distinct, nominal distances as well as a method to picture and reconstruct in 3D the surface of objects of different sizes. The device is preferably portable and it will be advantageous that its weight would not exceed two kilograms.

The portable stereophotogrammetry device disclosed is composed of a camera equipped with double optics enabling to simultaneously acquire at least two pictures according to two different viewing angles. The device is equipped with a system to measure the distance to the subject with at least two distinct pre-defined distances for picture taking.

It is an advantage that these at least two predefined distances are comprised within the distance in space where the image is focused, that is, within the depth of field of the optical systems.

Hence, with the same portable stereophotogrammetry device and associated method the user is able, for example, to image in 3 D the surface of the face using one of the at least two predefined distances and the surface of the breast by using another different of the at least two predefined distances.

DETAILED DESCRIPTION OF THE INVENTION

The invention is a preferably portable stereophotogrammetry device equipped with a system to position the subject at, at least, two pre-defined distances for picture taking. The portable stereophotogrammetry is equipped with a double optics enabling the acquisition of two simultaneous views with different angles of the subject. It is also equipped with a system to measure the distance at, at least, two pre-defined distances for picture taking.

It is an advantage that the two predefined distances are included within the part of the space within which the image is sharp, that is, that the positions set for the subject using these at least two measured distances are inside the depth of field of the stereophotogrammetry device.

The double optics of the stereophotogrammetry device can be manufactured in different ways without impacting the functionality of the invention, provided that it is characterized by an increased depth of field. The double optics can be manufactured by using a system of lenses and an image splitter built with a set of mirrors. In which case, it is advantageous to use a set of two secondary mirrors each receiving one image of the subject with a slightly different angle, each of these secondary mirrors reflecting the image to an opposed corresponding primary mirror, these two primary mirrors reflecting in turn the image toward the photosensitive surface of a camera through the set of lenses.

The set of lenses could be a unique set or a two separate sets of lenses, each of the two sets receiving one image from one of the two primary mirrors.

Alternatively, the two optics can be completely separated, having each its own set of independent lenses and no need of an image splitter based on mirrors.

The photosensitive surface of the camera can be unique, in which case the two images taken with different views are impacting this photosensitive surface side by side, or the camera can be equipped with two distinct photosensitive surfaces each receiving one image of the stereo-pair.

As we can see, there are many ways to implement a double optics system without impacting the nature of the present invention.

In a possible implementation of the invention, the device is equipped with at least two pairs of light beamers, each pair of light beamers converging at a different distance. Hence, by placing the subject so that the light patterns projected by a first pair of beamers are superposed on the surface of the subject one is placing the subject at one of the at least two pre-defined position. In addition, by placing the subject so that the light patterns projected by the second pair of beamers are superposed on the surface of the subject one is placing the subject at another of the at least two pre-defined position. It is then advantageous to use visual ways to distinguish between the two pairs of light patterns, for example by using different shapes or different colors for each pair of beamers.

In another possible implementation of the invention, the device is equipped with a pair of light beamers such that the distance where the two projected light patterns are converging can be tuned by the user to at least two distinct pre-defined distances. The advantage of such system is that the definition of the picture taking distance can be set, by tuning, when it is used and for much more than two pre-defined distances. Hence it has an advantage over a system with two fixed pairs of beamers that are restricted by manufacturing to only two pre-defined distances. However, in the case of a tunable converging beamers system it may be more difficult to ensure a reproducible distance and there may exist a risk to use undesirable intermediate and non-reproducible positions so each of the two systems, tunable or fixed beamers, has its own pros and cons depending upon its application.

In yet another implementation of the invention, the device is equipped with a pair of light beamers which are projecting patterns which can be superposed for at least two distinct distances. For example, each beamer could project two light spots and the superimposition of the most exterior spots of both beamers is enabling repositioning the subject at the farthest distance while the superimposition of the most interior spots of both beamers is enabling the repositioning the subject at the closest distance. Other patterns than pairs of spots can be used and it is an advantage to be able to distinguish visually the pattern used for the longest and for the shortest distance, for example, by changing the color or the shape of part of the pattern. For instance, the pattern of the left beamer can be composed, left to right, of a circle and a cross and the pattern of the right beamer can be composed, left to right, of a cross and of a circle. By superposing the two crosses one would achieve the shortest distance and by superposing the two circles one would achieve the longest distance. The advantage is to implement the invention by using a single fixed pair of beamers and the disadvantage is at the risk of confusing the user for pattern superimposition.

Yet another implementation of the invention is to use a telemetry system enabling to measure at least two pre-defined distances. There exists multiple telemetry system which could serve that purpose, based on the use of infrared, radar waves, interferometry . . . . The telemetry system can include the display of the measured distance hence enabling the placement of the subject at pre-defined distances. The telemetry system can also include a programming unit enabling the activation of a signal when one of at least two pre-defined distances is reached. This signal is to be considered with a broad meaning and could be a sound and/or a visual signal, or even an electromagnetic signal which can trigger picture taking when the nominal distance is reached. A visual signal can be the switching on or off of a light or the start or end of a blinking or non-blinking information provided by the telemeter, or any other visual signal.

For all these implementations of the invention, it is an advantage to have the device equipped with a switch enabling to select one of the at least two pre-defined distances for picture taking. In the case of at least two pairs of light beamers one switch position could activate one of the pair of light beamers and another position of the switch could activate another pair of light beamers, enabling the user to achieve easily and without possible confusion the at least two pre-defined distances. It could be an advantage that in a third position of the switch all beamers are switched off so that the system is equipped with a sleeping mode. If a telemeter is used instead of light beamers, the switch positions will activate different pre-programmed distances of the telemeter and in which case there would be an advantage that a position of the switch is used to shut down the telemeter.

When the invention is equipped with a switch to select one of the at least two distinct distances for picture taking, it is an advantage also that the power of the flash or flashes used by the system is adapted to the selected distance. For example, when a long distance is used, the flash power is increased and when a short distance is used the flash power is decreased, so that the brightness of the images are similar regardless of the selected distance.

One particularly useful implementation of the invention for plastic surgery or aesthetic dermatology applications is to set the at least two pre-defined distances so that for a short distance the field of view is close to an A4 surface format, that is a field of view of 21 cm by 29.7 cm and that for the longer distance the field of view is close to an A3 surface format, that is a field of view of 29.7 cm by 42 cm. In fact, an A4 field of view is particularly well suited for face imaging while an A3 field of view is particularly well suited for body and in particular breast imaging.

One technological challenge of the invention is to manufacture a stereophotogrammetry device whose depth of field, that is, the distance separating the two planes within which the image is focused, is deep enough to cover the at least two pre-selected distances. Indeed, as indicated in the background of the invention, the accuracy needed for the calibration of the optics is such that the different parts of the optics need to be fixed which is fixing also the position of the focus plane and is preventing the use of autofocus or manual focus systems.

In order to design a system with a depth of field sufficient to get a sharp image at a distance corresponding to an A4 field of view and obtain an image which is still sharp at a distance corresponding to an A3 field of view, it is advantageous to use an implementation of the invention making use of two separate sets of lenses with one set for each of the sub-optics, each of the two sets of lenses being composed of three lenses aligned and organized such that, by following the path of light coming into the camera, the three lenses are respectively a plano-convex lens, a biconcave lens and an achromatic doublet lens. According to our experiments, such superimposition of lenses is very useful to reach a depth of field compatible with a distance as short as an A4 field of view and a distance as far as an A3 field of view.

The method according to the invention consists in operating a device according to the invention and placing the subject at one of the at least two pre-defined view-taking positions according to the user's decision. The user is then taking one or several stereo-pairs at that pre-defined distance.

In one variation of this method the user is operating a switch in order to select one amongst the at least two pre-defined position before positioning the subject at the selected distance.

In case the user is using two pairs of light beamers, the user is choosing one nominal distance by switching on one of the two pairs of light pointers, then is placing the subject such that the patterns of the two light beamers are superposed on the surface of the subject. There are two equivalent ways to get the two patterns superposed—either the user can get the subject to move closer or farther or alternatively, the user can move forward or backward with the stereophotogrammetry device. The choice of the placing method between moving the camera or moving the subject has no importance relative to the present disclosure. Next, the user is taking one or several stereo-pairs at that pre-defined distance from the subject, alternating positioning and picture taking.

In case the user is using a single pair of light beamers with tunable converging distance, the user selects the desired distance of convergence of the light beamers amongst the at least two pre-defined distances and is placing the subject relative to the stereophotogrammetry system so that the two beam patterns are superposed and then takes one or several stereo-pairs at that distance.

In case of a single pair of fixed beamers where each beamer is projecting several patterns, the user is placing the subject such that common patterns or complementary patterns are superposed on the surface of the subject and then takes one or several stereo-pairs at that distance.

In case the user is using a stereophotogrammetry device equipped with a telemeter, the user is placing the subject relative to the stereophotogrammetry system so that the telemeter is indicated that one amongst the at least two pre-defined distances is reached and then takes one or several stereo-pairs at that distance. It is an advantage if the telemeter can be pre-programmed to activate a signal at pre-selected distance in which case, prior to position the subject relative to the stereophotogrammetry system, the user is programming the signal to activate it at one of the pre-selected distance and is placing the subject relative to the stereophotogrammetry system in order to activate the signal and taking one or several stereo-pairs at the distance activating the signal.

In yet another version of the method and once one or several stereo-pairs are acquired at one of the at least two pre-defined distances, the stereo-pairs are processed by a program in a computer in order to reconstruct in 3D the surfaces of the subject from the stereo-pairs. Then the computer is used to match and stitch together the different pieces of the 3D surfaces in order to produce a single representation of the 3D surface of the subject.

In a specific version of the method the user can choose:

a. Either to select a pre-defined position of the stereophotogrammetry device corresponding approximatively to an A4 field of view, then position the subject and take several stereo-pairs of the head of the subject at this distance. The different stereo-pairs are then processed by a computer to reconstruct the corresponding surfaces, match these different surfaces and stitch these surfaces in order to produce a comprehensive representation of the head of the subject.

b. Or select a second pre-defined position of the stereophotogrammetry device corresponding approximatively to an A3 field of view, then position the subject and take several stereo-pairs of the body of the subject at this distance. The different stereo-pairs are then processed by a computer to reconstruct the corresponding surfaces, match these different surfaces and stitch these surfaces in order to produce a comprehensive representation of the body part of the subject.

In an even more specific version of the method for which the closest pre-defined distance is corresponding to a field of view close to A4 and the farthest pre-defined distance is corresponding to a field of view close to A3 it is an advantage that:

a. When the user is selecting the pre-defined distance corresponding to the A4 format the user is picturing 3 or 4 times the face of the subject with the stereophotogrammetry device with a front view of the face, a side and slightly underside view of the face, a side and slightly underside view of the face for the other side and an optional fourth view taken from the front but below the face in order to better image the chin and neck of the subject. It must be noticed that the order in which these 3 or 4 views are taken has no impact on the method.

b. When the user is selecting the pre-defined distance corresponding to the A3 format the user is picturing 3 or 4 times the torso of the subject with the stereophotogrammetry device with a front view of the torso, a side and from underside view so that the inframammary fold of one breast of the subject is well pictured, a side and from underside view of the other side so that the inframammary fold of the other breast of the subject is well pictured. An optional front view can be taken from above and by rotating the stereophotogrammetry device by 90 degrees (clockwise or counter-clockwise) in order to picture well the top of the shoulders of the subject. Again, it must be noticed that the order in which these 3 or 4 views are taken has no impact on the method.

The advantage of the invention is therefore to use a single portable stereophotogrammetry system with two pre-defined distances, one pre-defined distance corresponding to an A4 format and enabling the 3D reconstruction of the head of the subject with a 3 or 4 views protocol and the other of the two pre-defined distances corresponding to an A3 format and enabling the 3D reconstruction of the torso of the subject with a 3 or 4 views protocol. By covering different anatomical surfaces with quite different surface areas the device and method according to the invention is enabling the 3D reconstruction of many different body parts ranging from the surface of a hand and up to a full body coverage.

We are now describing practical designs for the device. With reference to the drawings, a possible implementation of the device is composed of:

A camera body (1)

A double optics (2) adapted to the camera body (1) and composed of two sub-optics (2b) and (2c), enabling the acquisition of a stereo pair corresponding to two slightly different viewing angles.

A distance measuring system (34) enabling to measure at least two distinct distances for picture taking corresponding respectively to position (A3) and (A4) in the space in front of the stereophotogrammetry device.

The position (A3) and (A4) are comprised between the plane (6a) and the plane (6b) which are defining the depth of field (6), that is, the distance in space for which the images of the stereo pair are focused. (6a) is the plane the closest to the stereophotogrammetry device and for which the images start to be focused and (6b) is the plane farthest to the stereophotogrammetry device and for which the images are no more in focus.

In a specific implementation of the device, the distance measuring system (34) is composed of two pairs of light beamers such that the first pair of light beamers (3b) and (3c) is converging at the point (A3) and the second pair of light beamers (4b) and (4c) is converging at the point (A4).

It is then interesting to equip the device with a switch (5) enabling, according to the user's decision to switch on exclusively:

The light beamers (3b) and (3c) or

The light beamers (4b) and (4c)

It is also an advantage that the switch (5) is a 3-state switch where its third position is a sleeping mode position, switching off both light beamers pairs.

When equipped with a switch (5) and a flash, there is an advantage that when the switch (5) is positioned in order to take pictures at the shortest of the two distances (A4) the flash power is reduced and when the switch (5) is positioned in order to take pictures at the longest of the two distances (A3) the flash power is enhanced so that the intensities of images taken at the (A4) and (A3) distance positions are equivalent.

There will be an advantage that the flash is configured such that when a white target plane is imaged at the shortest distance (A4) using the reduced power of the flash and the same white target plane is imaged at the longest distance (A3) using the enhanced power of the flash, the difference in the position of the histogram pic in both images is less than 10% of the image intensity range.

Figure 1:
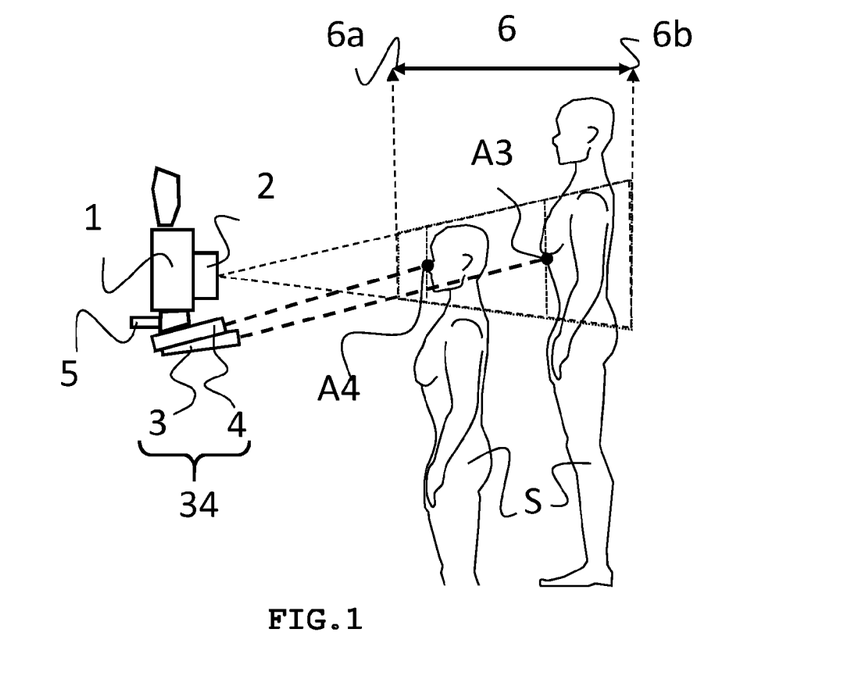
FIG. 1 is representing a possible implementation of the device viewed from the side.
Figure 2:
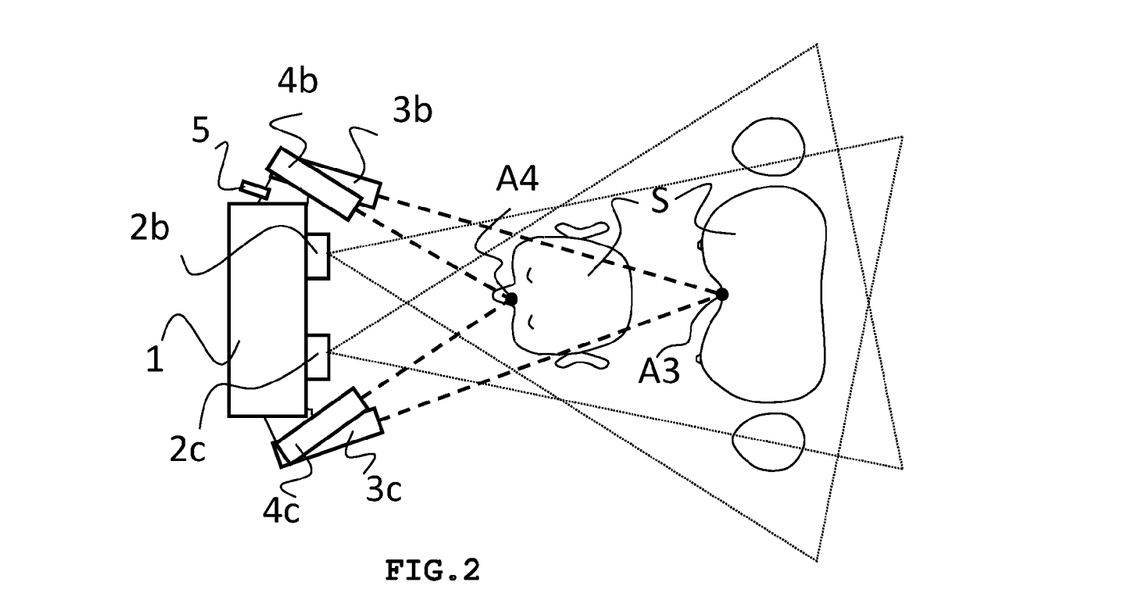
FIG. 2 is representing a possible implementation of the device viewed from the top.
Figure 3:
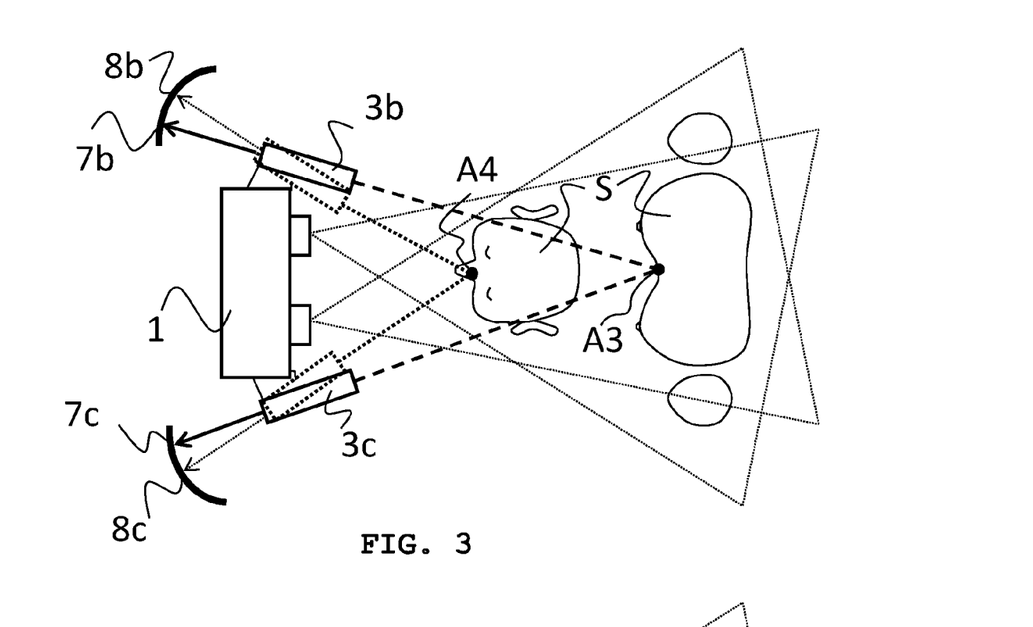
FIG. 3 is representing a possible implementation of the device including a pair of light pointers whose converging distance is tunable.

In another implementation of the device, the distance measurement system (34) is composed of a single pair of light beamers (3b) and (3c) whose distance for converging can be tuned so that by changing the converging distance a user can set the two beamers to converge at point (A3) or at point (A4). A possible way to design tunable light beamers is represented in FIG. 3. Each light beamer can rotate around an axis and is equipped with a semi-circular protractor and a spindle rigidly fixed to the light beamer to block its position. It is an advantage to schedule at least two blocking positions for each projector of its orientation relative to the semi-circular protractor; respectively (7b) and (8b) for the light beamer (3b) and (7c) and (8c) for the light beamer (3c), so that:

When the spindle of the light beamer (3b) is blocked at position (7b) and the spindle of the light beamer (3c) is blocked at position (7c), then the light beamers (3b) and (3c) are converging to point (A3).

When the spindle of the light beamer (3b) is blocked at position (8b) and the spindle of the light beamer (3c) is blocked at position (8c), then the light beamers (3b) and (3c) are converging to point (A4).

Figure 4:
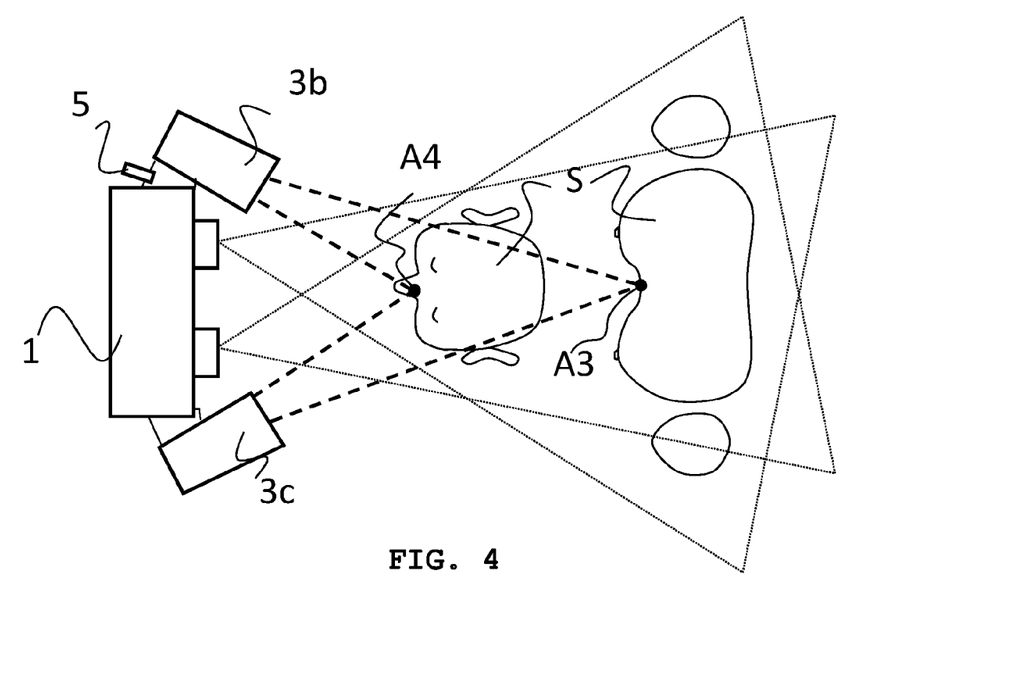
FIG. 4 is representing a device with a pair of light pointers, each projecting several light patterns.

In another implementation, the distance measurement system (34) of the device is equipped with a pair of light beamers (3b) and (3c) whose light patterns can be superposed at two distinct distances. According to the exemplary device shown in FIG. 4, each light beamer is projecting two light spots, one internal and the other external, so that the external light spots are superposed at the distance (A3) and the internal light spots are superposed at the distance (A4).

In yet another implementation, the distance measurement system (34) of the device is composed with a telemetry system enabling to define one amongst at least two predefined distances. According to the exemplary device shown in FIG. 5, a telemeter (9) is fixed to the camera body (1). The telemeter (9) can be equipped with a screen (10) displaying the distance measured between the telemeter (9) and the subject (S), as well as a switch (5) so that a first position of the switch (5) is triggering a signal (11-A4) when the measured distance corresponds to point (A4) and so that a second position of the switch (5) is triggering a signal (11-A3) when the measured distance corresponds to point (A3).

Figure 5:
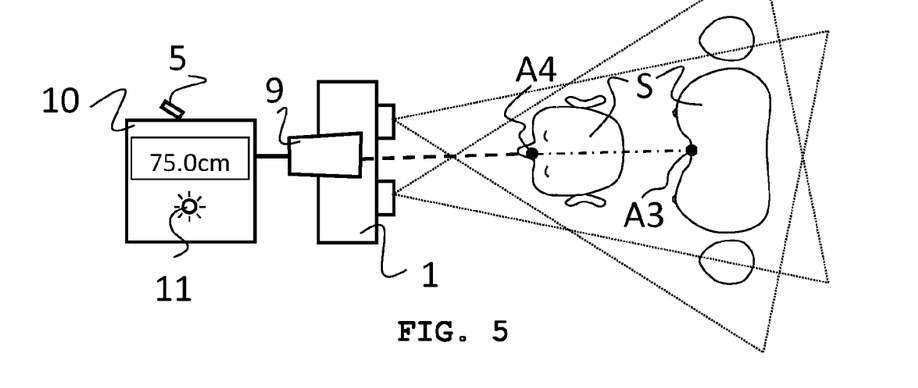
FIG. 5 is representing a device in which a telemeter is used to position the subject at one or the other of at least two distinct pre-defined distances.

In a particular implementation making use of a telemeter (9), the achievement of a positioning corresponding to distance (A3) or (A4) is indicated by signals with different color or with different sounds or in any other way to indicate that one or another pre-defined distance is reached.

In an implementation particularly useful for plastic surgery or aesthetic dermatology, there is an advantage that the shortest distance point (A4) is such that the intersection of the pyramid of the view taking corresponding to sub-optics (2b) or (2c) with the plane perpendicular to the viewing direction and including point (A4) corresponds to a surface which is close to an A4 paper format and that the farthest distance point (A3) is such that the intersection of the pyramid of the view taking corresponding to sub-optics (2b) or (2c) with the plane perpendicular to the viewing direction and including point (A3) corresponds to a surface which is close to an A3 paper format.

Figure 6:
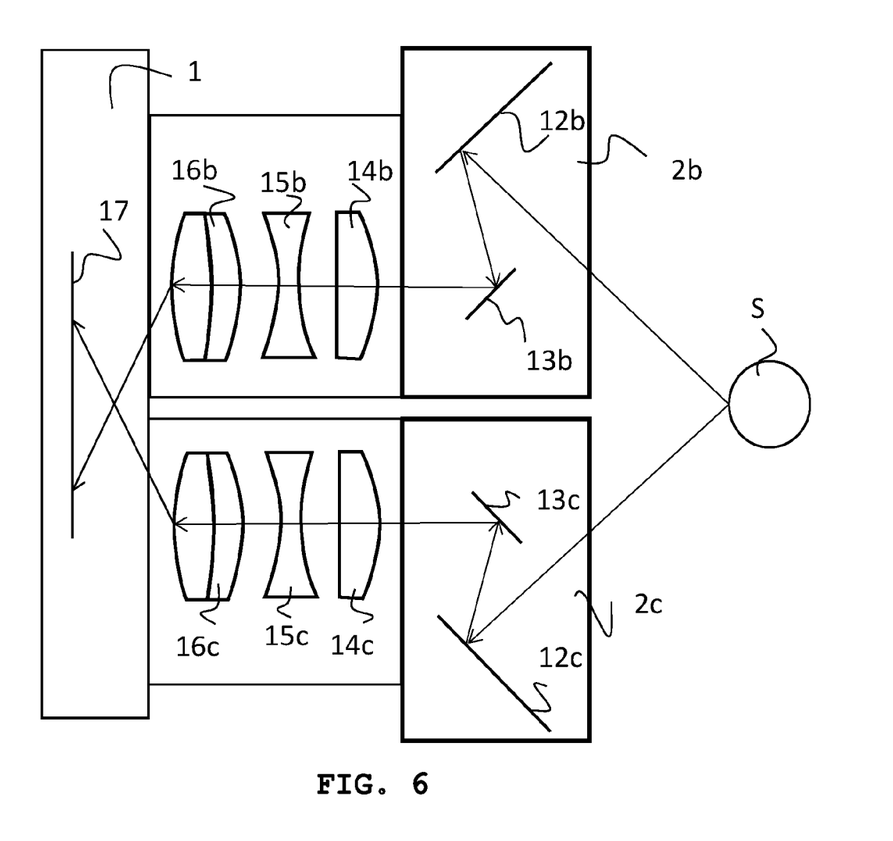
FIG. 6 is representing a variation of the invention with optics whose design is intended to provide a very deep depth of field.

According to the exemplary device in FIG. 6, which is presenting a possible implementation of the device having a very deep depth of field (6), the stereophotogrammetry device is making use of an image splitter such that each of the sub-optics (2b) and (2c) are composed of a set of two opposed mirrors and three lenses positioned such that, following the light path from the object to the photosensitive surface of the camera, the external mirrors called "secondary mirrors" (12b) and (12c) are receiving the image of subject (S) and are reflecting these toward inside mirrors (13b) and (13c), which in turn are reflecting the images toward an aligned set of 3 lenses per sub-optics composed with plano-convex lenses (14b) and (14c), then biconcave lenses (15b) and (15c) and then achromatic doublet lenses (16b) and (16c), and such that the two images of the stereo-pair are finally reaching the photosensitive surface (17) of the camera body (1) gathering the two images of the subject (S) as seen through the two sub-optics (2b) and (2c) into one single stereo pair.

Figure 7:
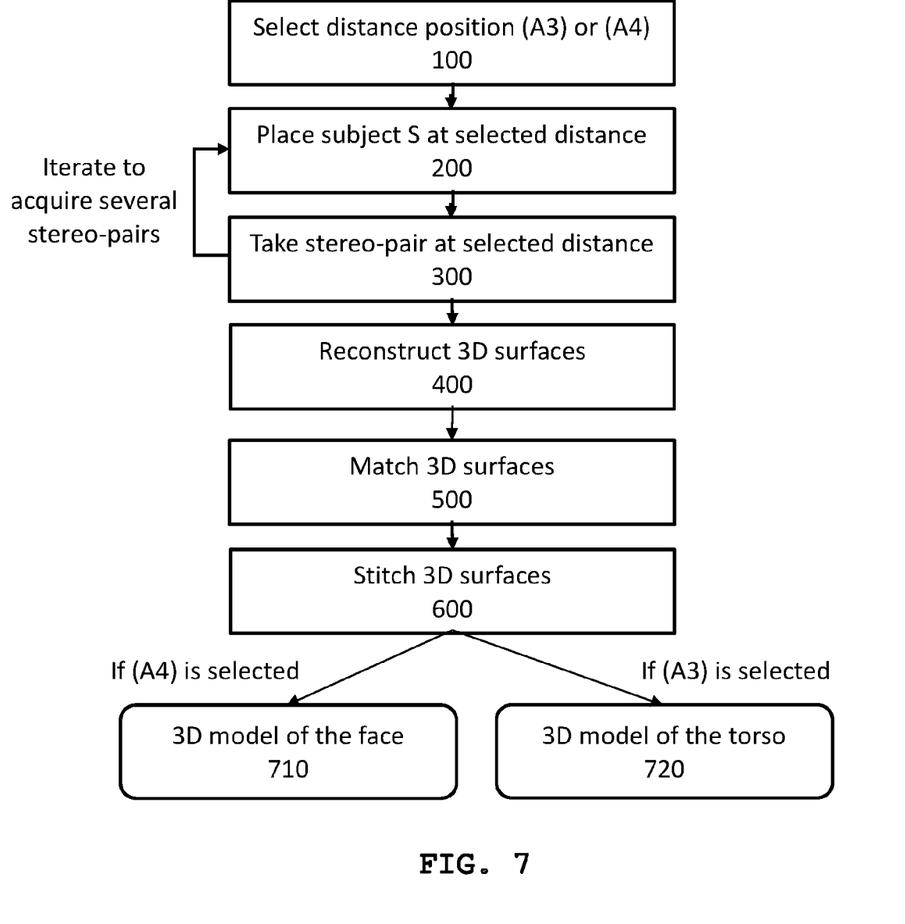
FIG. 7 is presenting a method enabling to take 3D surface representations of subjects placed at, at least, two distinct pre-defined distances.

The method disclosed is the process to operate a device according to the disclosure by:

Selecting one from at least two predefined distances (100).

Placing the subject at that selected distance from the stereophotogrammetry system (200).

Taking one or several stereo-pairs at that selected distance (300).

The placement of the subject (S) is made by using the device of the disclosure and either superposing the patterns projected by the light beamers, operating a telemeter or by other means to measure that distance.

According to a specific implementation of the method, the user is iterating between step (200): placement of the subject at the predefined distance and step (300): picture taking with the stereophotogrammetry device so that a given number of stereo-pairs corresponding to different viewpoints are acquired at the selected distance. A program on a computer is then processing the 3D surfaces corresponding to these different viewpoints (400). A program on a computer is then matching the different 3D surfaces in space (500). Finally, a program on a computer is stitching together the different 3D surfaces (600) in order to produce a comprehensive representation in 3D of the surface of the subject (S).

According to a specific implementation of the method making use of a device with pre-defined distances to take images corresponding approximately to format A4 and format A3, the user starts between:

(100) selecting the distance to position (A4) corresponding to format A4

(200) position the subject at said distance position (A4)

(300) take several stereo-pairs of the face of subject (S) at that distance position (A4)

(400) a program in a computer is reconstructing 3D surfaces of the face from the stereo-pairs (500) a program in a computer is matching the different 3D surface (600) a program in a computer is stitching the different pieces of 3D surfaces into a comprehensive representation of the face (710) of the subject (S).

Or (100) selecting the distance position (A3) corresponding to format A3

(200) position the subject at the given distance position (A3)

(300) take several stereo-pairs of the torso of subject (S) at that distance position (A3)

(400) a program in a computer is reconstructing 3D surfaces of the torso from the stereo-pairs (500) a program in a computer is matching the different 3D surface (600) a program in a computer is stitching the different pieces of 3D surfaces into a comprehensive representation of the torso (720) of the subject (S).

Figure 8:
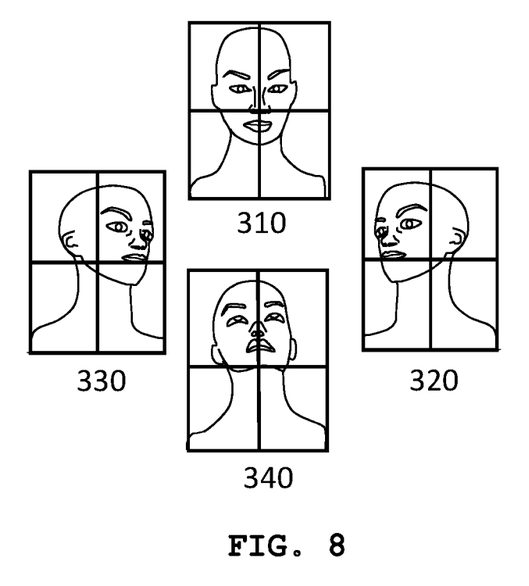
FIG. 8 is presenting viewpoints optimized for imaging a face using a field of view close to an A4 surface format.

When the series of stereo-pairs acquired at the distance position (A4) for the face of subject (S), it is an advantage for the method that the angle of the views are close to those presented in FIG. 8, that is with a first view taken from the front (310), a second view taken from the side of the face and slightly under (320), a third view taken from the other side of the face and slightly under (330) and a fourth optional view taken from the front but slightly under (340).

Figure 9:
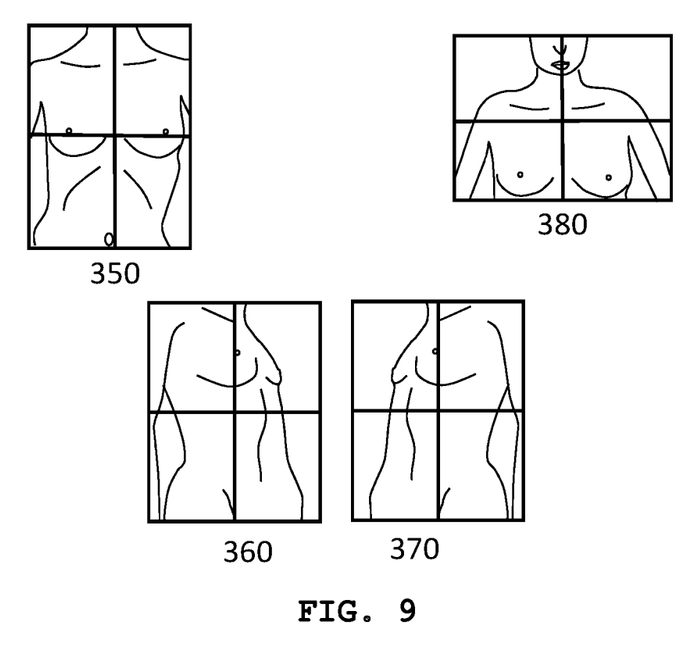
FIG. 9 is presenting viewpoints optimized for imaging a torso using a field of view close to an A3 surface format.

When the series of stereo-pairs acquired at the distance position (A3) for the torso of subject (S), it is an advantage for the method that the angle of the views are close the these presented in FIG. 9, that is with a first view taken from the front (350), a second view taken from the side of the torso and slightly under one breast (360), a third view taken from the other side of the torso and slightly under the other breast (370) and a fourth optional view taken from the front and very high above the subject (380) but with the stereophotogrammetry camera rotated of an angle of 90°. Views (360) and (370) are particularly useful to image the inframammary fold of each breast.

The device and method according to the disclosure are specifically intended to acquire with a single portable stereophotogrammetry camera views of subjects at two distinct distances. The device and method are particularly useful for the reconstruction in 3D of comprehensive representation of the head on one side and of the torso on the other side of the subject, covering the principal needs of plastic surgeons and aesthetic dermatologists with a single and portable imaging device.

What is claimed is:

1. A device for stereophotogrammetry comprising a camera body (1) and a double-optics (2) comprising two sub-optics (2b) and (2c), configured for a simultaneous acquisition of two views according to two different angles, wherein the device is comprising a positioning system (34) configured to define a position of a target subject (S) for one of at least two distinct pre-defined point positions (A3, A4) of the target subject (S) relative to the stereophotogrammetry device, the at least two distinct predefined point positions comprising a closer point position (A4) and a farther point position (A3), the closer point position (A4) being closer to the stereophotogrammetry device than the farther point position (A3), and wherein the positioning system (34) is comprising at least two pairs of light beamers (3b, 3c) and (4b, 4c) where a first pair of light beamers (3b, 3c) is converging to the farther point position (A3) and a second pair of light beamers (4b, 4c) is converging to the closer point position (A4), and wherein the device comprises a switch (5) comprising a first selection position configured to select the farther point position (A3) and a second selection position configured to select the closer point position (A4), wherein the switch (5) is configured to switch on the first pair of light beamers (3b, 3c) in the first selection position and wherein the switch (5) is configured to switch on the second pair of light beamers (4b, 4c) in the second selection position.

2. The device according to claim 1 wherein the at least two distinct pre-defined positions (A3, A4) are included in a space region corresponding to a depth of field (6) of the double-optics (2).

3. The device according to claim 1 wherein the closer point position (A4) and the farther point position (A3) are such that a surface of a field of view corresponding to the farther point position (A3) is at least 25% larger than a surface of a field of view corresponding to the closer point position (A4).

4. The device according to claim 3 wherein the field of view corresponding to the closer point position (A4) is equal to a normalized surface format A4, that is 21 cm times 29.7 cm, with possible variation of plus or minus 40% of a surface of the normalized surface format A4 and the field of view corresponding to the farther point position (A3) is equal to a normalized surface format A3, that is 29.7 cm times 42 cm, with possible variation of plus or minus 40% of a surface of the normalized surface format A3.

5. The device according to claim 1 wherein each sub-optics comprises a lenses system comprising three lenses including in the order of a direction of light entering the sub-optics, respectively:

A plano-convex lens (14b, 14c)

A biconcave lens (15b, 15c)

And an achromatic doublet lens (16b, 16c).

6. The device according to claim 1, comprising a flash having a higher power level and a lower power level and wherein the switch (5) is configured to select the higher power level in the first selection position and to select the lower power level in the second selection position and wherein the higher power level is greater than the lower power level.

7. The device according to claim 6, wherein the higher power level and lower power level are configured such that an image of a white target placed at the closer point position (A4) when the switch is in the second position and an image of the white target placed at the farther point position (A3) when the switch is in the first position have intensities with a difference of less than 10% of image intensity.

8. A method comprising using the stereophotogrammetry device according to claim 1, comprising:

activating the switch (5) of the positioning system (34) to select one out of the at least two distinct point positions (100); and switching on the first pair of light beamers (3b, 3c) if the first selection position configured to select the farther point position (A3) is selected or switching on the second pair of light beamers (4b, 4c) if the second selection position configured to select the closer point position (A4) is selected; and moving the stereophotogrammetry device and/or the target subject (S) so that the target subject (S) is at that selected pre-defined point position (200); and taking one or several stereo-pairs at that selected pre-defined point position (300).

9. The method according to claim 8 comprising taking several stereo-pairs at the selected pre-defined point position and:

reconstructing 3-Dimensional surfaces of the target subject (S) corresponding to each of the stereo-pairs (400); and matching the different 3-Dimensional surfaces in space (500); and stitching together the different surface pieces of the target subject (S) into a comprehensive 3-Dimensional representation (600).

10. The method according to claim 9 comprising using a computer program product stored on a non-transitory media to operate the steps of: reconstructing, matching and stitching.

11. The method according to claim 8 comprising selecting (100):

Either the closer point position (A4), and then placing a face of the target subject (S) at the closer point position, and then taking several stereo-pairs of the face of the target subject (S) at the closer point position, processing these stereo-pairs to reconstruct 3-Dimensional surfaces of the face of the target subject (S), then matching these different 3-Dimensional surfaces in space and finally stitching together these different 3-Dimensional surfaces into a comprehensive 3-Dimensional surface representation (710) of the face of the target subject (S); or the farther point position (A3), and then placing a torso of the target subject (S) at the farther point position, and then taking several stereo-pairs of the torso of the target subject (S) at the farther point position, processing these stereo-pairs to reconstruct 3-Dimensional surfaces of the torso of the target subject (S), then matching these different 3-Dimensional surfaces in space and finally stitching together these different 3-Dimensional surfaces into a comprehensive 3-Dimensional surface representation (720) of the torso of the target subject (S).

\* \* \* \* \*

(12) INTER PARTES REVIEW CERTIFICATE (4096th)

United States Patent
Thirion

(10) Number: US 10,070,119 K1
(45) Certificate Issued: Aug. 8, 2025

(54) DEVICE AND METHOD TO RECONSTRUCT FACE AND BODY IN 3D

(71) Applicant: Jean-Philippe Thirion

(72) Inventor: Jean-Philippe Thirion

(73) Assignee: QUANTIFICARE SA

Trial Number:

IPR2021-01511 filed Sep. 7, 2021

Inter Partes Review Certificate for:

Patent No.: 10,070,119
Issued: Sep. 4, 2018
Appl. No.: 15/289,981
Filed: Oct. 11, 2016

The results of IPR2021-01511 are reflected in this inter partes review certificate under 35 U.S.C. 318(b).

INTER PARTES REVIEW CERTIFICATE
U.S. Patent 10,070,119 K1
Trial No. IPR2021-01511
Certificate Issued Aug. 8, 2025

AS A RESULT OF THE INTER PARTES REVIEW PROCEEDING, IT HAS BEEN DETERMINED THAT:

Claims 1-4 and 8-11 are cancelled.

\* \* \* \* \*